Nov. 26, 1929.  E. J. MOHN ET AL  1,737,512
CARPULE REFILLER
Filed Sept. 7, 1928  2 Sheets-Sheet 1

Elmer J. Mohn and
Clarence M. Maland
INVENTORS

BY Victor J. Evans
ATTORNEY

WITNESS:

Nov. 26, 1929.  E. J. MOHN ET AL  1,737,512
CARPULE REFILLER
Filed Sept. 7, 1928   2 Sheets-Sheet 2
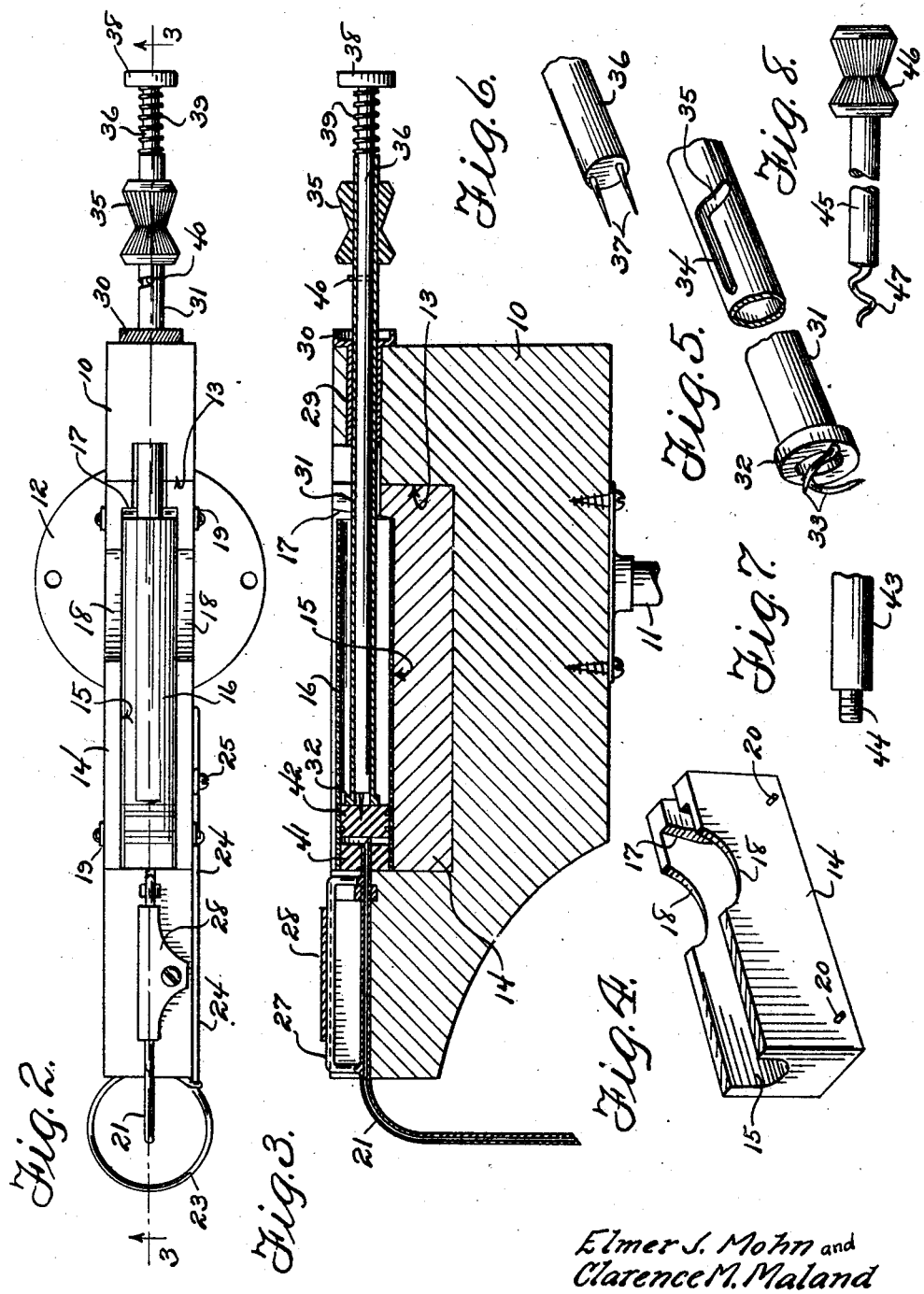
Elmer J. Mohn and
Clarence M. Maland
INVENTORS
BY Victor J. Evans
ATTORNEY
WITNESS:

Patented Nov. 26, 1929

1,737,512

UNITED STATES PATENT OFFICE

ELMER J. MOHN AND CLARENCE M. MALAND, OF ELMORE, MINNESOTA

CARPULE REFILLER

Application filed September 7, 1928. Serial No. 304,558.

This invention comprehends the provision of means for refilling carpules with novocaine or any other medicine or drug used by dentists and physicians, the invention residing in a novel construction and arrangement of parts whereby carpules can be quickly and conveniently refilled at a considerable saving.

In carrying out the invention we contemplate the construction of an apparatus for the purpose above mentioned, whereby carpules of various sizes can be quickly and conveniently refilled.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:

Figure 2 is a top plan view.

Figure 3 is a sectional view on line 3—3 of Figure 2.

Figure 4 is a perspective view of the carpule holder.

Figure 5 is a fragmentary perspective view of the plunger sleeve.

Figure 6 is a similar view of the plunger.

Figure 7 is a similar view of a modified construction.

Figure 8 is a view of an auxiliary plunger rod.

Figure 1:
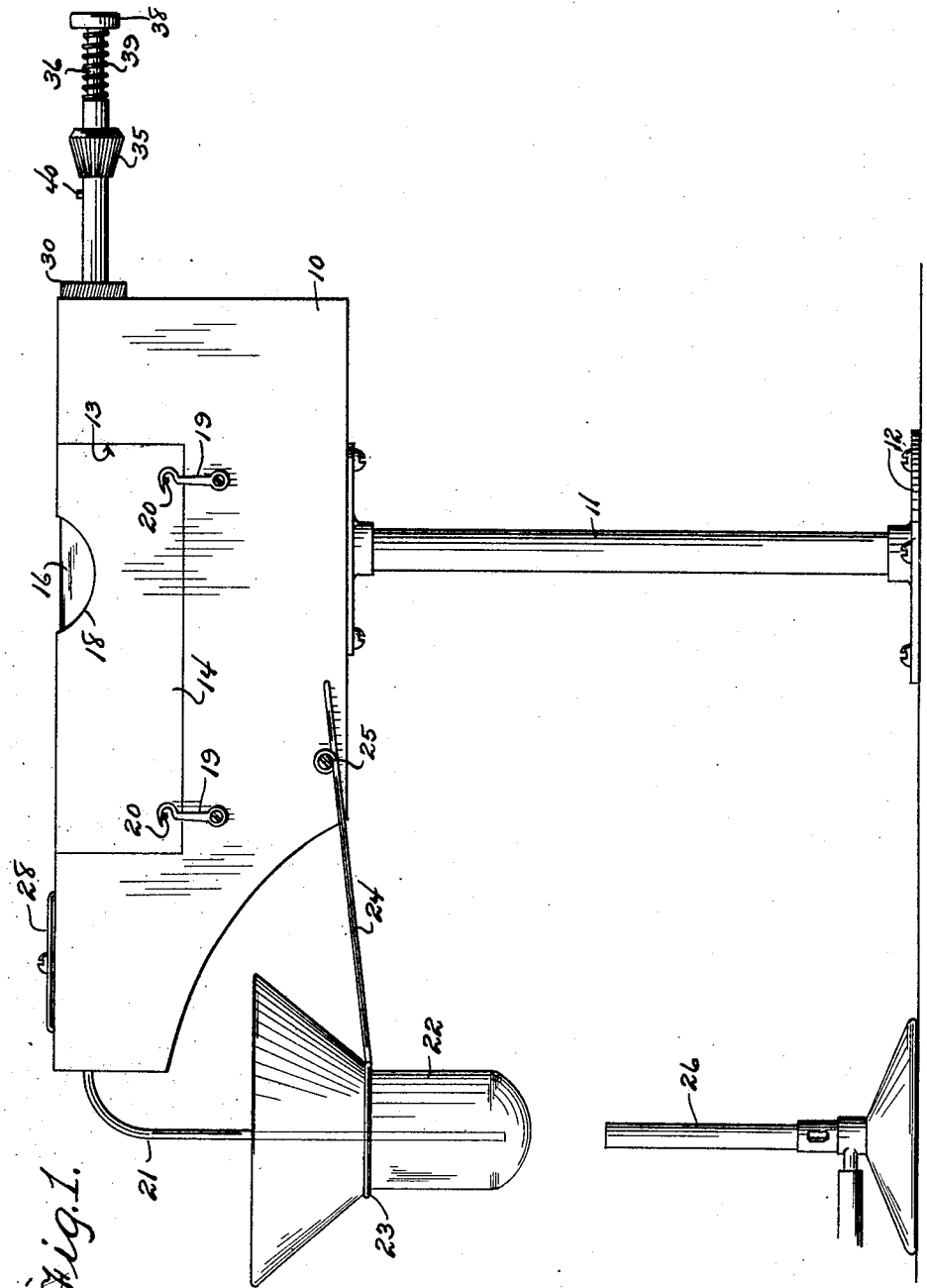
Figure 1 is a side elevation of the apparatus forming the subject matter of the present invention.

The apparatus forming the subject matter of the present invention comprises a support 10 which is preferably mounted upon a standard 11 rising from a base 12. The support 10 is preferably in the nature of an elongated block of wood or any other suitable material provided with a recess 13 opening at the top thereof. The recess is adapted to receive a carpule holder 14 clearly illustrated in Figure 4, and preferably in the nature of a block of suitable material recessed as at 15 to receive and support the glass tube 16 constituting the body of the carpule. One end wall of the recess 15 is tapered or inclined as at 17 for a purpose to be hereinafter described. The carpule holder is also cut away at opposite sides of the recess as at 18 so that the glass tube 16 may be conveniently grasped for the purpose of inserting the carpule within its holder or removing it therefrom. The holder 14 may be secured to the support 10 in any suitable manner, but we preferably employ hooks 19 which are pivoted upon the side of the holder 10 and adapted to engage pins 20 projecting from the side of the holder 14.

Arranged upon the support 10 at one end of the recess 13 is a small tube 21 which is adapted to be seated in a groove formed in the support 10, and formed with a depending portion as illustrated in Figures 1 and 3, which portion is adapted to enter the cup 22 in which the medicine to be used is mixed or prepared. This cup may be supported upon the support 10 in any suitable manner, preferably by means of an annulus 23 formed on one end of a supporting rod 24 secured to the support as at 25. The cup is also preferably arranged or supported above a burner indicated generally at 26 used in the preparation of the medicine or drug to be used in the carpule. The tube 21 is formed with an inverted U-shaped portion 27 which is engaged by a clamp 28 for holding the tube fixed on the support 10. The inner end of the tube 21 partly projects within the recess 15 of the carpule holder when the latter is associated with the support, for a purpose to be presently described.

Supported on the other end of the support 10 is a bushing 29 having a flanged head 30 bearing against the end of the support as clearly illustrated in Figures 2 and 3. Slidable through the bushing 29 and also through the support 10 is a sleeve 31 having a head 32 formed on one end thereof and from which head projects a plurality of pointed prongs 33. The sleeve 31 projects an appreciable distance beyond the end of the support 10 and is formed with a substantially L-shaped slot the branches of which are indicated at 34 and 35 respectively. The sleeve is, of course, adapted to be moved longitudinally of the support for which purpose the sleeve is provided with a suitable knob 35. Slidably received by the sleeve 31 is a plunger rod 36 from the inner end of which project pointed prongs 37 which may vary in number without departing from the inventive idea. The plunger rod 36 is, of course, capable of sliding movement independently of the sleeve 31 and is provided with a knob or handle 38 for this purpose. Surrounding the plunger rod 36 and interposed between the adjacent end of the sleeve 31 is a knob or handle 38 with a coil spring 39 which normally exerts an outward pressure upon the plunger rod 36. The rod 36 is provided with a pin 40 which operates in the L-shaped slot in a manner and for a purpose to be hereinafter described.

In practice, when it is desired to refill the carpule, a glass tube constituting the body portion of the carpule is arranged within the recess 15 of the holder 14, with the rubber disk 41 closing one end of the tube, while a rubber disk 42, which normally forms a closure for the other end of the tube, is arranged within the latter immediately adjacent the disk 41. The disk 42 is used as a piston for the refilling of the carpule, and subsequently used to close one end of the tube 16. When the tube 16 is being inserted within the recess 15 of the holder 14, it is moved slightly longitudinally, by reason of the fact that one end of the glass tube is moved downwardly over the inclined wall 17, and during this movement of the tube 16, the adjacent end of the tube 21 pierces the disk 41. The plunger rod 36 is then moved inwardly through the carpule body until the prongs 37 pierce or penetrate the disk 42, and held in this position while the sleeve 31 is being moved in the same direction, and partly rotated to force the prongs 33 into the disk 42. When the sleeve 31 is manipulated in the manner just described, that is, moved in the direction of the disk 42, the branch 35 of the L-shaped slot of the sleeve is also being moved in the direction of the pin 40 carried by the plunger rod 36, so that when the sleeve 31 is slightly rotated to force the prongs 33 into the disk 42, the pin 40 is received in the branch 35 of the slot of said sleeve. Consequently the sleeve and plunger rod are thereby held fixed relatively so that they may be removed as a unit through the support 10, sliding the disk 42 through the carpule body in the capacity of a piston, whereupon the medicine or other drug is sucked into the carpule from the cup 22. The end wall of the recess 15 limits movement of the disk 42 under these conditions, so that after the carpule has been properly refilled, the disk 42 is positioned for use in the capacity of a stopper or closure for the adjacent end of the glass tube 16.

The sleeve 31 and plunger rod 36 are then separated from the disk 42, which can be easily accomplished by reversing the rotation of the sleeve 31 thereby removing the prongs 33 from the disk 42. During this rotation of the sleeve 31 the position of the L-shaped slot is shifted so that the pin 40 is then aligned with the branch 34 of the slot, so that the sleeve can be retracted, after which the plunger rod 36 can also be retracted.

In some carpules, the closure disk at one end thereof is provided with a metal center having a threaded recess, in which instance a plunger rod of the character illustrated in Figure 7 may be used, and wherein the rod is indicated at 43 and provided with a reduced threaded extension 44 so that the rod can be conveniently threaded into the recess.

If desired, a plunger rod of the character illustrated in Figure 8 may be employed in place of the plunger rod and sleeve above described. In said figure the plunger rod is indicated at 45 and provided with a suitable knob or handle 46 at one end, the other end of the rod being provided with a corkscrew extension 47. The invention provides a novel and unique means for refilling carpules in a quick and convenient manner with a result saving incident to their use by dentists and physicians.

While it is believed that from the foregoing description the nature and advantages of the invention will be readily understood, we desire to have it known that we do not limit ourselves to what is herein illustrated and described and that such changes may be resorted to when desired as fall within the scope of what is claimed.

What is claimed is:

1. Means for refilling carpules comprising a support adapted to receive the carpule body, a medicine containing cup supporting means mounted on one end of the support, a curved filling tube arranged on the support and adapted to penetrate the adjacent end of the carpule body to establish communication therebetween and said cup, said carpule body having its other end slidably arranged within its body, and means for moving said end through the body to draw the medicine into the latter from said cup.

2. Means for refilling a carpule comprising a support upon which the carpule body is adapted to be mounted, a medicine mixing cup supporting means arranged upon the support, a curved filling tube carried by the support and having one end arranged to penetrate the adjacent end of the carpule body and establish communication between the latter and said cup, the other end of said carpule body being utilized as a piston slidably arranged within said body, and means slidably arranged upon the support for engagement with said piston to move the latter through the carpule for the purpose specified.

3. Means for refilling a carpule comprising a support upon which the carpule body is adapted to repose, a medicine mixing cup supporting means mounted on the support, a curved filling tube arranged on the support with one end positioned to penetrate the adjacent end of the carpule and establish communication between the latter and said cup, the other end of said carpule being utilized as a piston and slidably positioned within the body thereof, and means including a plunger rod slidably mounted upon the support and adapted to detachably engage said piston for moving the same through said carpule body for the purpose specified.

4. Means for refilling a carpule comprising a support upon which the carpule is adapted to repose, a medicine mixing cup mounted on the support, a filling tube arranged thereon and having one end positioned to penetrate the adjacent end of the carpule, and thereby establish communication between the latter and said cup, the other end of said carpule being utilized as a piston and slidably positioned within the body thereof, a sleeve slidably mounted upon the support and adapted to enter the carpule for engagement with said piston, a plunger rod slidable in the sleeve and also adapted to engage the piston to hold the latter against rotation while said sleeve is being attached thereto, said sleeve and rod moving the piston through the carpule body to refill the latter with medicine from the cup, and a yieldable element surrounding said rod.

5. Means for refilling a carpule comprising a support upon which the carpule body is adapted to repose, a medicine mixing cup supporting means mounted on the support, a curved filling tube arranged upon the support and including a depending portion adapted to enter the cup, means for clamping the tube on the support with one end arranged to penetrate the adjacent end of the carpule, and thereby establish communication between the latter and said cup, the other end of said carpule being utilized as a piston and slidably positioned within the body thereof, and means slidably arranged upon the support and adapted to engage said piston to move the latter in a direction to refill the carpule with medicine from the cup.

6. Means for refilling a carpule comprising a support having a recess therein, a carpule holder comprising a block adapted to be positioned within the recess and having a longitudinal recess to receive the carpule, one end wall of the recess in said block being inclined whereby said carpule is moved longitudinally of the block while being associated therewith, a medicine mixing cup arranged on the support, a filling tube mounted on the support and having a depending portion entering the cup, said tube having one end partly projecting within the recess of said block and adapted to penetrate the adjacent end of the carpule when the latter is positioned within the holder, thereby establishing communication between the carpule and said cup, the other end of said carpule being utilized as a piston and slidably positioned within the body thereof, and means on the support for engaging said piston and moving the latter through the carpule to refill the latter with medicine from the cup.

7. Means for refilling a carpule comprising a support upon which the carpule is adapted to repose, a medicine mixing cup mounted on the support, a filling tube arranged thereon and having one end positioned to penetrate the adjacent end of the carpule, and thereby establish a communication between the latter and said cup, the other end of said carpule being utilized as a piston and slidably positioned within the body thereof, a sleeve slidably mounted upon the support and adapted to enter the carpule for engagement with said piston, a plunger rod slidable in the sleeve and also adapted to engage the piston, a slot and pin connection between the plunger rod and sleeve for holding said parts fixed relatively when engaged with the piston, said sleeve and rod moving the piston through the carpule body to refill the latter with medicine from the cup, and a yieldable element surrounding said rod.

In testimony whereof we affix our signatures.

ELMER J. MOHN.
CLARENCE M. MALAND.